(12) United States Patent
Kjellander (10) Patent No.: US 11,264,165 B2
(45) Date of Patent: Mar. 1, 2022

(54) DECORATIVE PANEL COMPRISING AN INDUCTIVE COIL

(71) Applicant: TRESPA INTERNATIONAL B.V. [NL/NL], Weert (NL)

(72) Inventor: Birgitta Katarina Charlotte Kjellander, Weert (NL)

(73) Assignee: TRESPA INTERNATIONAL B.V., Weert (NL)

(*) Notice: Subject to any disclaimer, the term of this patent is extended or adjusted under 35 U.S.C. 154(b) by 735 days.

(21) Appl. No.: 16/076,184

(22) PCT Filed: Feb. 9, 2017

(86) PCT No.: PCT/NL2017/050079
§ 371 (c)(1),
(2) Date: Aug. 7, 2018

(87) PCT Pub. No.: WO2017/138812
PCT Pub. Date: Aug. 17, 2017

(65) Prior Publication Data
US 2021/0090796 A1    Mar. 25, 2021

(30) Foreign Application Priority Data
Feb. 9, 2016 (NL) .................................. 2016241

(51) Int. Cl.
*H01F 38/14* (2006.01)
*B32B 29/00* (2006.01)
(Continued)

(52) U.S. Cl.
CPC ............ *H01F 38/14* (2013.01); *B32B 3/30* (2013.01); *B32B 7/12* (2013.01); *B32B 29/005* (2013.01);
(Continued)

(58) Field of Classification Search
CPC ........ H01F 38/14; H01F 27/36; H01F 41/041; H01F 27/24; H01F 27/2804; H02J 7/0042;
(Continued)

(56) References Cited

U.S. PATENT DOCUMENTS 4,503,115 A    3/1985   Hemels et al.
2008/0099665 A1   5/2008   Baudon
(Continued)

FOREIGN PATENT DOCUMENTS

CN    103208848 A    7/2013
WO    2011163544 A2    12/2011

OTHER PUBLICATIONS

International Search Report for International Application No. PCT/NL2017/050079 dated May 8, 2017.

*Primary Examiner* — Catherine A. Simone
(74) *Attorney, Agent, or Firm* — Suiter Swantz pc llo (57) ABSTRACT

The present invention relates to a decorative panel, comprising a core layer provided with a decor layer, said décor layer comprising a substrate layer provided with at least one coating, wherein within said decorative panel at least one induction coil is located. The present invention furthermore relates to the use of such a decorative panel in indoor and/or outdoor furniture and in interior and/or exterior decoration.

19 Claims, 7 Drawing Sheets

(51) Int. Cl.
*H01F 27/36* (2006.01)
*H02J 50/10* (2016.01)
*H02J 50/70* (2016.01)
*B32B 3/30* (2006.01)
*B32B 7/12* (2006.01)
*B32B 29/06* (2006.01)
*B44C 5/04* (2006.01)
*H02J 7/00* (2006.01)

(52) U.S. Cl.
CPC ............ *B32B 29/06* (2013.01); *B44C 5/0484* (2013.01); *H01F 27/36* (2013.01); *H02J 7/0042* (2013.01); *B32B 2260/028* (2013.01); *B32B 2260/046* (2013.01); *B32B 2307/212* (2013.01); *B32B 2457/00* (2013.01); *B32B 2479/00* (2013.01); *H02J 50/10* (2016.02); *H02J 50/70* (2016.02)

(58) Field of Classification Search
CPC .. H02J 50/10; H02J 50/70; H02J 7/025; H02J 5/005; B44C 5/0484; B32B 3/30; B32B 7/12; B32B 29/005; B32B 29/06; B32B 2260/028; B32B 2260/046; B32B 2307/202; B32B 2307/212; B32B 2457/00; B32B 2479/00; Y10T 428/24934; Y10T 428/31993; Y10T 428/31982

See application file for complete search history.

(56) References Cited

U.S. PATENT DOCUMENTS

| | | |
|---|---|---|
| 2013/0078437 A1 | 3/2013 | Symkens et al. |
| 2013/0093386 A1 | 4/2013 | Tsai et al. |
| 2014/0091638 A1 | 4/2014 | Azancot et al. |
| 2015/0325362 A1* | 11/2015 | Kumura ................ H01F 27/255 336/84 M |
| 2016/0104566 A1* | 4/2016 | O'Brien ................ B32B 29/00 307/104 |

\* cited by examiner

DECORATIVE PANEL COMPRISING AN INDUCTIVE COIL

TECHNICAL FIELD AND BACKGROUND

The present invention relates to a decorative panel, comprising a core layer provided with a decor layer wherein the décor layer comprises a substrate layer provided with at least one coating. Furthermore, the present invention relates to the use of such a panel.

Decorative high-pressure compact laminates manufactured by the present applicant are known for outdoor applications. Such laminates consist of layers of wood-based fibres (paper and/or wood) impregnated with thermosetting resins and surface layer(s) on one or both sides, having decorative colours or designs. A transparent topcoat is added to the surface layer(s) and cured to enhance weather and light protecting properties. These components are bonded together with simultaneous application of heat and high specific pressure to obtain a homogeneous non-porous material with increased density and integral decorative surface. These panels have been disclosed in, inter alia, U.S. Pat. Nos. 4,801,495, 4,789,604, US Patent application 2013/0078437 in the name of the present applicant.

For example US Patent application publication No. 2013/0078437 relates to a method for producing a decorative film comprising a resin-impregnated substrate paper provided with one or more top layers, wherein the method comprises the following steps: providing a resin-impregnated substrate paper, printing the substrate paper with an ink composition, using an inkjet, subjecting the substrate paper printed with an ink composition to a treatment of the drying and/or curing, applying at least one transparent top layer to the paper, and curing the paper to obtain the decorative film. This US application also discloses a method for manufacturing a decorative panel, wherein a carrier material is durably bonded to the decorative film.

Such panels are non-intelligent panels. This means that the function of these panels is for construction and for aesthetic purposes only. But, interactive panels are known in the art, for example a nightstand with wireless charging.

Wireless chargers are already on the market and are, for example, sold by IKEA. The IKEA concept includes the IKEA business idea to offer a wide range of well-designed, functional home furnishing products. One of their actual products is SELJE, namely a nightstand with wireless charging. This product is a wireless charger, a product that makes it possible to charge a smartphone, without messy cables. They are also offering a wireless charger that you can build into furniture yourself, called JYSSEN, i.e. a wireless charger that fits perfectly into the cable outlet of desks. All these IKEA furniture applications with built-in wireless chargers require that a hole is drilled in the surface panel, wherein an induction charger is placed into the hole. The surface is covered by a cap of material which is different from the panel itself. Such built-in wireless chargers can be easily removed, for example by thieves in public areas such as waiting rooms, reading rooms and cafes wherein tables are provided with these built-in wireless chargers.

DuPont offers a Wireless Charging Ring which acts as an adapter. The Ring is plugged into the device's charging port and acts as a receiver of the magnetic field created by the active induction coil, the wireless charging unit, which is placed below DuPont™ Corian® solid surface or Zodiaq® quartz surface. Only an authorized Corian® or Zodiaq® fabricator/installer may install the Individual Wireless Charging Unit underneath the surface. This requires the fabricator/installer to mill out an area of the backside of the surface or in the support material below the DuPont™ Corian® solid surface or Zodiaq® quartz surface.

US Patent application publication No. 2008/099665 relates to a sensory panel, comprising a plastic body disposed in a vehicle and constituting at least a portion of a panel forming part of the vehicle, the body having a first face directed into an interior of the vehicle; and a radiant energy sensor integral with the plastic body and constructed to receive radiant energy from the interior of the vehicle. This US application also relates to a method for manufacturing a sensory panel, comprising inserting a film substrate into a molding tool for forming at least a portion of a vehicle panel, placing a radiant energy sensor adjacent the film substrate in said molding tool so as to sense radiant energy passing through the film substrate; and introducing a moldable material into the molding tool to integrally mold the sensor with the film substrate to form the portion of the vehicle panel, wherein the placing step includes connecting an induction coil to the radiant energy sensor and placing it together with the sensor.

CN103208848 relates to a wireless charging power supply which comprises a body, wherein an inner chamber of the body is provided with an input module and at least one wireless charging module, and an upper surface of the body is provided with at least one plane which is provided with a charging area which is used for performing charging on an external terminal in the charging area. The wireless charging module is provided with at least one sensing unit which is adjacent to the charging area; the input module which is connected with the wireless charging module is used for receiving external power supply and supplying power for the wireless charging module.

US Patent application publication No. 2013/093386 relates to a slot-type induction charger comprising a power base holding therein a control module and a power-supplying coil module in a base member thereof for inducing an electric current, and an induction charging receiver set in the base member for receiving the induced electric current by electromagnetic induction from the power base for charging an electromagnetic device being connected to an electrical connector thereof. DE19811076 discloses a laminate with a number hot pressed resin-impregnated fiber web layers, of which at least some layers of paper and at least the top layer is a transparent overlay layer, wherein in a layer plane of the overlay layer a plurality of light emitting diodes is embedded in the layers.

WO2016/058003 relates to a decorative, multi-layer surfacing material comprising: a first resin-impregnated paper layer and a second resin-impregnated paper layer, and a first conductive material having a first terminus and a second terminus and capable of carrying an electric current from the first terminus to the second terminus; wherein the first conductive material is disposed on a first surface of the first resin-impregnated paper layer; wherein the first resin-impregnated paper layer and the second resin-impregnated paper layer are disposed in a stacked and compressed relationship such that the first conductive material is encapsulated between the first resin-impregnated paper layer and the second resin-impregnated paper layer; and wherein at least one of the first resin-impregnated paper layer, the second resin-impregnated paper layer or an optional additional resin-impregnated paper layer is a decorative layer.

Inductive power coupling allows energy to be transferred from a power supply to an electric load without a wired connection there between. An oscillating electric potential is applied across a primary inductor. This sets up an oscillating magnetic field in the vicinity of the primary inductor. The oscillating magnetic field may induce a secondary oscillating electrical potential in a secondary inductor placed close to the primary inductor. In this way, electrical energy may be transmitted from the primary inductor to the secondary inductor by electromagnetic induction without an induction connection, such as a wire, between the inductors. When electrical energy is transferred from a primary inductor to a secondary inductor, the inductors are said to be inductively coupled. An electric load wired in series with such a secondary inductor may draw energy from the power receiver wired to the primary inductor when the secondary inductor is inductively coupled thereto. The principle of such inductive transmission systems has been disclosed in International application WO 2012-081028.

EP 2 936 927 relates to an inductive rechargeable handheld tool battery apparatus having a cell unit and having a secondary charging unit that is provided for direct energy acceptance upon charging of the cell unit, and that has at least one first integrated charging interface that is constituted by an induction coil. Such an inductive rechargeable battery apparatus is a rechargeable battery apparatus for temporarily storing electrical energy, in particular a rechargeable lithium ion battery. Examples of a handheld power tool are a power drill, a drill driver and/or impact driver, a saw, a plane, a screwdriver, a milling cutter, a grinder, an angle grinder, a garden tool, and/or a multifunction tool.

BRIEF SUMMARY

An object of the present invention is to provide a decorative panel that has an interactive function.

Another object of the present invention is to provide decorative panel that is provided with an induction charger for electronic devices.

Another object of the present invention is to provide a decorative panel that is provided with an induction charger for electronic devices where the induction charger is seamlessly integrated into the panels and cannot be seen from the outside.

Another object of the present invention is to provide a decorative panel that is provided with an induction charger for electronic devices wherein the decorative panel does not have to be post-processed for incorporating the induction charger.

Another object of the present invention is to provide a decorative panel that is provided with an induction charger for electronic devices wherein the induction charger cannot be easily removed from the panel.

Another object of the present invention is to provide a decorative panel that is provided with an induction charger for electronic devices wherein the propagation of stray field in the decorative panel is minimized.

The present invention thus relates to a decorative panel, comprising a core layer provided with a decor layer, the décor layer comprising a substrate layer provided with at least one coating, characterized in that within the decorative panel at least one induction coil is located.

The present inventors found that with such a panel one or more of the aforementioned object have been achieved. Especially the location of the at least one induction coil enables the provision of a panel from which the induction coil cannot be taken away without destructing the panel. In addition, according to the present invention the induction coil is seamlessly integrated into the panel during the manufacturing process of the panel. Therefore, no post-processing actions such as drilling of holes or openings need to be taken. Furthermore, the complete integration of the induction coil in the panel has resulted in a panel having a joint free surface which makes is suitable to be used in environments where high hygienic standards are required. A surface without joints is beneficial from a hygienic point of view since bacteria will easier grow in joints and seams than on a flat surface. Moreover, the surface of the present panel as such does not have any increases or grooves so that any electronic device suitable for wireless charging can be easily placed and moved on top of that surface. In addition, the original aesthetics of the panel provided with such an induction coil will be maintained. The same applies for the mechanical properties of the present panel provided with such an induction coil. The term "within the decorative panel" as used herein means that the at least one induction coil cannot been seen or touched from the outside of the decorative panel without destructing the decorative panel. This term means also that the at least one induction coil is not positioned at the outermost surface of the decorative panel, i.e. in a visible position, but in a position below the outermost surface of the decorative panel, i.e. in an invisible position.

According to the present invention the induction charging requires an induction coil, through which an electrical current is applied. That generates a magnetic field. When another coil with opposite winding direction is placed in close proximity of the induction coil, the magnetic field from the induction coil interacts with the other coil and electric current is produced at that coil. The electric current from that coil is charging the devices in which that coil are located. And the aforementioned induction coil is located within the present decorative panel.

Examples of electronic devices suitable for wireless charging include, but are not limited to, communication devices, mobile phones, PDAs, media players, GPS devices, personal entertainment units, tablet computers, (smart) watches, wearables, such as fitness trackers, VR (virtual reality) headsets, controllers, drones, domestic apparels.

In a preferred embodiment of the decorative panel the at least one induction coil is located between the decor layer and the core layer.

According to another embodiment of the decorative panel the at least one induction coil is located within the décor layer.

In such an embodiment the at least one induction coil is preferably located between the substrate layer and the at least one coating.

According to another embodiment of the decorative panel the at least one induction coil is located within the at least one coating.

According to another embodiment of the decorative panel the at least one induction coil is located within the core layer.

It must be clear that the present invention is not restricted to only one specific position of the at least one induction coil in the present decorative panel. It is possible to have an embodiment wherein several induction coils are located within the present decorative panel, even at different horizontal and vertical positions within the panel. This means also that induction coils may be placed at the circumference the panel, at the centre, or in a specific geometric pattern, or any combination thereof.

The induction coil that is incorporated in the present panel can be printed on a paper or another type of a carrier, for example a flexible foil made of plastic or textile, or can consist of rigid or flexible coils, such as metal coil, or a combination thereof. In a specific embodiment of the present invention several induction coils are present in a panel. In the present panel the presence of any wireless charger in the panel cannot be seen from the outside of the panel.

In an embodiment the present decorative panel further comprises at least one shielding layer for the electromagnetic field generated by the at least one induction coil, the at least one shielding layer is located within the decorative panel.

The induction coil in the present decorative panel (so called "primary coil") creates an electromagnetic field. The so called "secondary coil" (in the device, outside the decorative panel) is interacting with the electromagnetic field and current is generated to that device via the secondary coil. To minimize leakage of current between primary and secondary coil, the coils should be placed in close proximity. The efficiency (strength of electromagnetic field) decreases rapidly with increased distance between the coils. The electromagnetic field from the primary coil should be absorbed by the secondary coil, but can also be absorbed by other materials with high permeability such as e.g. iron and nickel. When such magnetic and/or ferromagnetic materials absorb the electromagnetic field, the gained energy is transferred to heat (eddy current). For products including induction coils, a magnetic field is present (necessary for the power transfer). Though ideally the full magnetic field from the primary coil should be absorbed by the secondary coil, this is not the case. Part of the magnetic field is not absorbed by the secondary coil, the amount depending on efficiency factors as vertical, lateral and angular miss-alignment of the secondary coil (see figure below). This part of 'non-absorbed' magnetic field, here called stray field, can be absorbed by other magnetic and/or ferromagnetic materials. The absorption of this energy can cause a localized hotspot which can give negative effect on the panel properties, with delamination and cracking as a result.

The present inventor found that the heat thus generated may cause fractures in the decorative panel and the physical performance and lifetime of the resent decorative panel may be adversely affected. In order to prevent these effects it is preferred to shield the surrounding electric components (that include magnetic and/or ferroelectric materials), for example the electric current connectors to the primary coil, mounting details (in e.g. iron) as e.g. table legs, screws and objects placed on the decorative panel surface.

Therefore a local hot spot in a decorative panel creates large temperature profiles in the decorative panel, which induces stress in the panel. Stress in the decorative panel will have a negative effect on the panel performance, giving rise to decreased mechanical properties, cracking and delamination. Thus the lifetime of the decorative panel may decrease.

In an embodiment the at least one induction coil is surrounded by the at least one shielding layer.

The present inventors assume that the magnetic field that is generated by electrical current (in the coil in the present panel) is inversely proportional to the cube of the distance (at the center line) from the coil. The magnetic field decrees to below 2% of initial value at a distance of 20 cm from the coil (seen from the central line through the coil). The magnetic field away from the centerline is more difficult to calculate, but is in general lower compared at the central line. This is especially the case when multiple loops are present in the coil (which is the case for induction chargers). In a preferred embodiment, the size of the shielding layer for the present invention stretches a minimum value of 20 cm around the induction coil.

In another embodiment the at least one induction coil is positioned between the décor layer and the at least one shielding layer.

In another embodiment the at least one shielding layer is provided with at least one recess, the at least one induction coil is positioned in the at least one recess. Such a recess can be for example a hole or an opening the shielding layer. Such a recess can be such that the induction coil is embedded in the recess, i.e. all sides of the coil are covered by the shielding layer, except for the top surface.

The present invention is not restricted to the application of one single shielding layer, but several shielding layers may be applied in the present decorative panel.

The shielding layer comprises at least one of magnetic and ferro-magnetic materials, preferably chosen from the group of ferrite, nickel and cobalt, or combinations thereof. In the shielding layer these magnetic and ferro-magnetic materials can be used as pure metals. In another embodiment of a shielding layer these magnetic and ferro-magnetic materials are used as composites, e.g. embedded in a polymer matrix. Examples of magnetic/ferromagnetic materials include ferromagnetic materials: iron, nickel, cobalt (and their alloys) and some of the rare earths (gadolinium, dysprosium), paramagnetic substances: platinum, aluminum and oxygen, and diamagnetic materials: carbon, copper, water, and plastic.

In an embodiment the at least one shielding layer comprises a matrix material provided with a dispersion of at least one of magnetic and ferro-magnetic materials.

Examples of embodiments of shielding layers include: ferromagnetic microwires-embedded polymer composites, monodispersed spheres of ferromagnetic embedded into a polymeric matrix, sputtered thin film ferromagnetic metal oxides, multi-layered shields, e.g. multi layers of ferromagnetic materials sandwiched between insulators (non-ferromagnetic oxides or polymers).

The induction coil(s) incorporated in the present panel require(s) at least one power supply. In a specific embodiment the induction coil is connected to an external power source, i.e. a power source that is not integrated in the panel as such. In such an embodiment the induction coil(s) can be connected to an external power source via separate wires. In another embodiment the panel also includes at least two induction coils that are connected in series and/or parallel using wires. Such wires may be designed as a conductive mesh. The at least one wire or conductive mesh can be connected to an external power source for actuating the induction coil(s) located within the panel.

According to an embodiment the present decorative panel comprises at least two induction coils, wherein the at least two induction coils are connected in series or in parallel by means of wires. These wires can be connected to at least one power source. Such a power source can be an external power source, i.e. a power source that is not incorporated in the present decorative panel. In a specific embodiment of the present panel several coils are located within the panel, each coil being connected via branch wires to a main power cable of a central power strip or multiple sockets. A so called power bank can function as an external power source.

According to another embodiment a battery is used as a power source for the induction coil(s), wherein both the battery and the induction coil(s) are integrated in the present panel, i.e. within the present panel. In such an embodiment the power source can be identified as an internal power source. The battery can be placed directly in contact with the induction coil(s), or be connected with wires at a distance from the induction coil(s). A battery can charge at least one integrated coil. Such a battery can be a wireless rechargeable battery. The use of a rechargeable battery enables to apply the present panel in areas where no power is available, such as in remote areas or in recreational areas, for example parking lots, campgrounds, beaches etc. The term battery as used here also encompasses a combination of individual batteries.

In the present decorative panel the core layer preferably comprises a thermo pressed stack of resin impregnated papers, for example phenol resin impregnated papers. According to another embodiment thermo formable sheets, non-wovens and wovens of wood fibres, glass fibres, textile fibres, synthetic fibres, metallic fibres, ceramic fibres, carbon fibres, or a mixture thereof, can be used to partly or completely replace the paper in the resin impregnated stack. In yet another embodiment the core layer may comprise one or more so-called prepregs. Such a prepreg can be considered as a consolidated core of a fibre containing material comprised of wood or cellulose fibres which are coated with a thermosetting synthetic resin. The thickness of prepregs may be considerable larger than a typical paper, and may include thicknesses >1 cm, or even greater.

A method for manufacturing prepregs has been disclosed in U.S. Pat. Nos. 4,503,115 and 6,387,489 in the name of the present applicant. For example according to U.S. Pat. No. 6,387,489 after drying the fibres are stored or passed directly to spreader equipment. The resin-treated fibres may be further processed without or with pigments. The mixture made from resin-treated fibres and pigments is introduced to spreader equipment which deposits the fibres and the pigments continuously and uniformly with random orientation, producing, distributed across the entire width of a horizontal conveyor belt, a web-like mat, which is press-molded either individually or together with other web-like mats of this type, to form the core layer. After continuous shaping of the mat on the conveyor belt, using scrapers, brushes, belts or rollers, the prepreg is given a preliminary press-moulding and compacted, with thickness reduction, in calendering equipment. According to U.S. Pat. No. 4,503,115 wood or cellulose fibers are added to an aqueous solution of thermo-setting synthetic resin to coat the wood or cellulose fibers with the thermosetting synthetic resin in an uncured state; forming the coated fibers into a randomly deposited non-woven web-like mat; predensifying the web-like mat; and heating and pressing the predensified mat under conditions sufficient to harden the resin, wherein the heating and compressing step comprises pressing the mat together with at least one decorative foil at a temperature between about 130 to 180° C. and a pressure of between about 30 to 100 bar. Such a method further comprises the step of applying at least one decorative layer to the surface of the molded article after the heating and pressing step.

In another embodiment it is also possible to locate the at least one induction coil within the thermo pressed stack of resin impregnated papers.

In order to prevent the formation of an uneven outer surface of the present panel the present inventors found that is possible to provide the stack of resin impregnated papers with one or more recesses. Those recesses can be used to position the at least one induction coil in the respective recesses. In such an embodiment it is preferred that the recesses provided with induction coils are covered with at least one thermo pressed resin impregnated paper. The formation of one or more recesses is valid for each type of core layer as mentioned above. The recesses can also be used for placement of the power source. In an embodiment of the present decorative panel one or more recesses are provided with one or more shielding layers, in which one or more recesses the at least one induction coil is placed.

The present construction of the panel and the induction coil(s) is such that the induction coil(s) cannot be removed without destructing the panel. During the step of bonding together the individual components, i.e. the core layer, the induction coil(s) and the décor layer, with simultaneous application of heat, for example 120° C., and high specific pressure (>7 MPa) a homogeneous non-porous panel with increased density and integral decorative surface is obtained. The induction coil(s), optionally the power sources as well, are thus fully embedded in the present panel and these devices are invisible from the outside.

The present invention is also suitable for the production of CPL (continuous press laminates) and LPL (low pressure laminates). Low pressure laminates comprises materials used to coat surfaces, formed by two or three papers impregnated with melamine thermosetting resins to which plasticisers are added. The papers are joined strongly together by hot pressing at low pressures. The physical and technical properties of these materials are inferior to those of high pressure laminates, but are more than adequate for coating furniture components that will not undergo much stress and, in particular, are suitable for producing edges. A HPL (High Pressure Laminate) is manufactured via a high pressure/high temperature lamination process, while a CPL (Continuous Pressure Laminate) is laminated under low pressure. This results in variations in performance particularly in terms of strength and ease of installation. The present invention also covers the Double Belt Press (DBP) for the production of Continuous Pressed Laminate (CPL). CPL is decorative paper impregnated with resins and fused under heat and high pressure with resin impregnated backer(s). Laminate properties are similar to standard HPL and typical thickness range is 0.4 mm to 1 mm. Flexible CPL is decorative paper impregnated with flexible thermosetting resins and fused under heat and high pressure with resin-impregnated backer(s).

The present inventors found that instead of pressing the induction coil in-between the papers with thermo curable resins, at least one induction coil can be placed in cavities made in a thermo formable sheet of material. The dimensions of the cavity are preferably such that after placing the induction coil in the cavity of the sheet, the surface of the sheet will be completely flat. The sheet with induction coil(s) is placed within a stack of décor and papers with thermo curable resin, just below the décor, or with at least one paper with thermo curable resin between the sheet and the décor. In a specific embodiment the side of the sheet where the induction coil is placed is, is closest to the décor. According to another embodiment the décor is laminated onto the sheet with induction coil, the sheet acting as the core material. In yet another embodiment the thermo formable sheet replaces the substrate layer of the décor, or is incorporated above or below the substrate layer. In one of such embodiments the substrate layer of the décor layer comprises at least one thermo formable sheet. The adhesion can be stimulated by applying an adhesive on the sheet, the décor or both, before lamination.

In an embodiment the substrate layer of the décor layer is chosen from the group of resin impregnated papers, non-wovens and wovens made of wood fibres, glass fibres, textile fibres, synthetic fibres, metallic fibres, ceramic fibres and carbon fibres, or a combination of these fibres. In a specific embodiment resin impregnated papers can be combined with non-wovens and/or wovens. In another embodiment the substrate layer of the décor layer can also be chosen from the group of polymeric foils, metallic foils and ceramic foils, or a combination of anyone of these foils. In a specific embodiment resin impregnated papers can be combined with non-wovens and/or wovens and/or foils as mentioned here.

The thermo formable sheet may include one or more thermoplastic polymers, wherein the thermoplastic polymers will plastically deform upon applying thermal pressure. The thermoplastic sheet may include fillers, as minerals, reinforcement fibres of e.g. glass, synthetic, carbon, or other types. The purpose of the fillers is to modify the physical properties of the thermo formable sheet, as e.g. reinforce it.

The present invention also relates to a decorative panel wherein the core comprises at least one thermo formable sheet. In such an embodiment the core may further comprise a stack of resin impregnated papers, wherein the at least one thermo formable sheet is positioned between the décor layer and the stack of resin impregnated papers. In another embodiment a thermo curable layer is preferably positioned between the décor and the thermo formable sheet a thermo curable layer, preferably resin impregnated paper.

The at least one thermo formable sheet is preferably provided with one or more recesses, in which one or more recesses the at least one induction coil is placed. Such a recess can also contain a power source.

The integrated induction coil is encapsulated by the panel, which protects the device to the environment. Such environmental protection can include but is not limited to wind, weather, sun, chemicals, scratches, temperature, moisture and humidity. The encapsulation also prevents unintentional removal (theft) of the induction coil(s) and power source(s) when incorporated in the panel as well.

The present invention furthermore relates to the use of the present decorative panel in indoor and/or outdoor furniture. Examples of furniture are table tops, laboratory tables, kitchen work tops, nightstands, hot plates, countertops, benches, chairs, or stools, as well as tables, such as coffee tables, dining tables, cocktail tables, conference tables, side tables, picnic tables, or outdoor tables.

In a specific embodiment the present decorative panel can be used in exterior walls, ceilings and facades.

The present invention also relates to the use of the present decorative panel in interior and/or exterior decoration.

Examples of applications of the present panels include, but are not limited to, the following: tables, benches or other furniture at schools, libraries, educational instances where students make use of handheld electronic devices for educational purposes, tables, benches or other furniture at restaurants, bars, cafes where clients can charge their handheld electronic devices while enjoying other services, tables, benches or other furniture at hospitals, healthcare centres, nursing centres, where a seamlessly integrated charger gives an easy to clean and antibacterial surface, tables, benches or other furniture in airports, train stations, bus stations, ferry terminals or other public transportation means or at other public meeting places, a non-removable (theft prevention) charger with an easy to clean (time efficient) surface provides public visitors a possibility to charge their handheld devices. The present panels can be used as exterior or interior panels in buildings or monuments as well. Another application is the integration of the present panel in the furniture or wall decoration at waiting stops or terminals for public and private transport, or the integration in the furniture or wall decoration in airplanes, cars, train wagons, bus interior or ferry interior. And, the use of the present panels in nightstands, bedside cabinets and worktops of a household kitchen.

The advantages of the present panel can thus be identified as follows: non-visible, seamless integration, encapsulation, i.e. protection against environment, whereas the physical properties of panel remain unaltered compared to a panel without the present induction coil(s).

BRIEF DESCRIPTION OF THE DRAWINGS

The present invention will be discussed in the following figures.

DETAILED DESCRIPTION

Figure 1A:
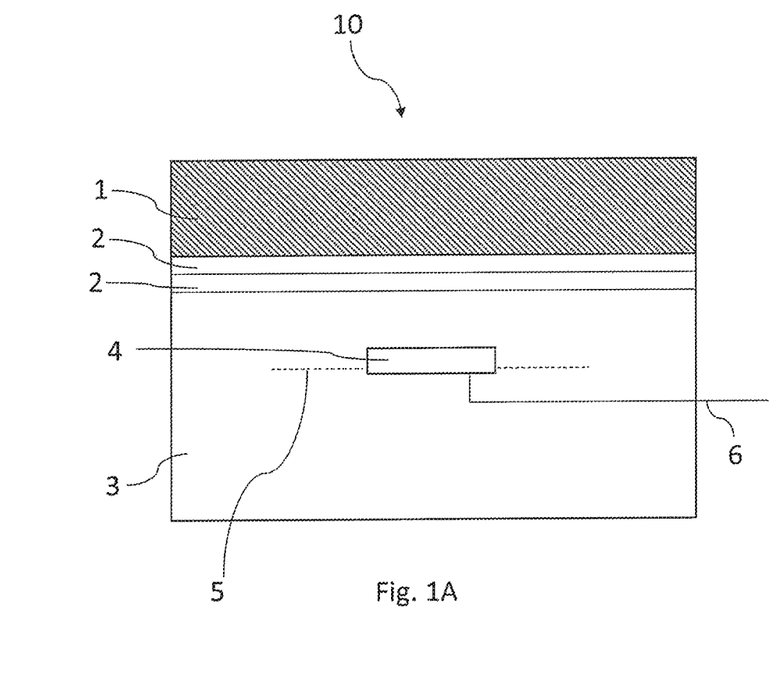
FIG. 1A shows an embodiment of the decorative panel wherein the shielding layer is provided with a hole in which an induction coil is positioned.
Figure 1B:
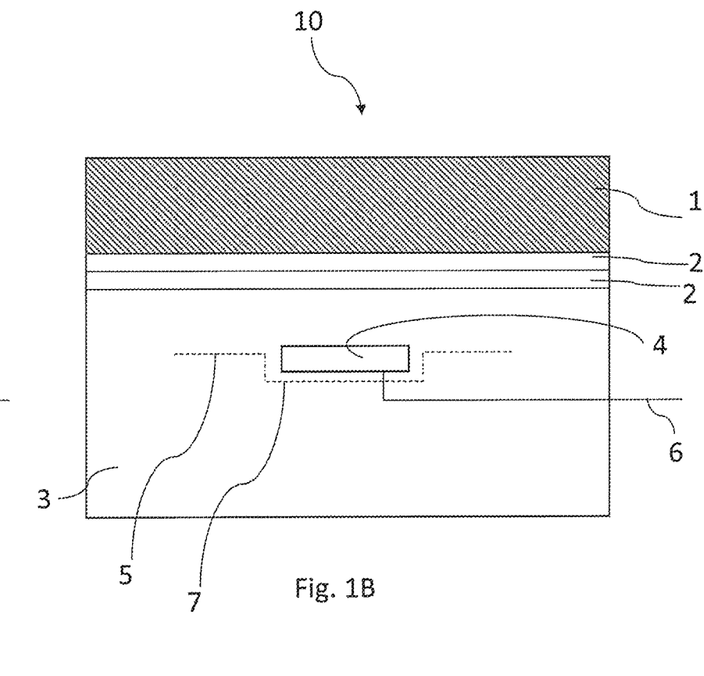
FIG. 1B shows an embodiment of the decorative panel wherein the shielding layer is provided with a recess in which an induction coil is positioned.
Figure 1C:
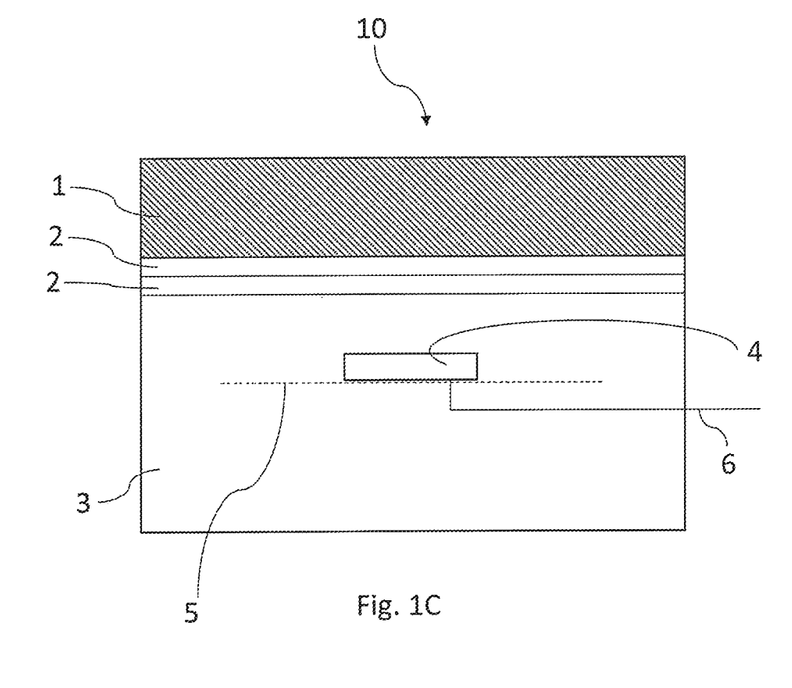
FIG. 1C shows an embodiment of the decorative panel wherein an induction coil is positioned on a shielding layer.

In FIGS. 1A-1E the following reference numbers are used: 10=decorative panel, 1=décor layer, 2=resin impregnated paper/prepreg, 3=core layer, 4=induction coil, 5=shielding layer, 6=electric wire and 7=recess. These FIGS. 1A-1C are schematic drawings of the panel before the pressing step.

According to FIG. 1A decorative panel 10 includes a shielding layer 5, shielding layer 5 being provided with a hole in which induction coil 4 is positioned. Between core layer 3 and décor layer 1 one or more sub layers 2 are presented, e.g. resin impregnated paper layer(s) or prepreg(s). Electric wire 6 is positioned below shielding layer 5. Décor layer 1 has been show here as one single layer but décor layer 1 may comprise several layers. The same applies for core layer 3.

According to FIG. 1B in decorative panel 10 a shielding layer 5 is provided with a recess 7 in which induction coil 4 is positioned. Electric wire 6 continues through shielding layer 5 into core layer 3 and is positioned below shielding layer 5. Between core layer 3 and décor layer 1 one or more sub layers 2 are presented, e.g. resin impregnated paper layer(s) or prepreg(s). Décor layer 1 has been show here as one single layer but décor layer 1 may comprise several layers. The same applies for core layer 3.

According to FIG. 1C in decorative panel 10 induction coil 4 is positioned on shielding layer 5. Electric wire 6 continues through shielding layer 5 into core layer 3 and is positioned below shielding layer 5. Between core layer 3 and décor layer 1 one or more sub layers 2 are presented, e.g. resin impregnated paper layer(s) or prepreg(s). Décor layer 1 has been show here as one single layer but décor layer 1 may comprise several layers. The same applies for core layer 3.

Figure 1D:
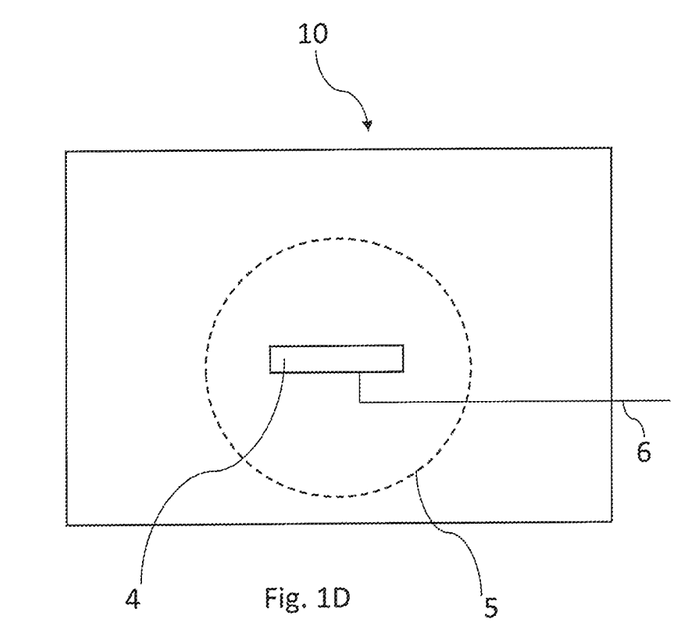
FIG. 1D shows a top view of an embodiment of the present decorative panel.

According to FIG. 1D (front view) decorative panel 10 is provided with induction coil 4 surrounded by shielding layer 5. The size of shielding layer 5 stretches a minimum value of 20 cm around induction coil 4.

Figure 1E:
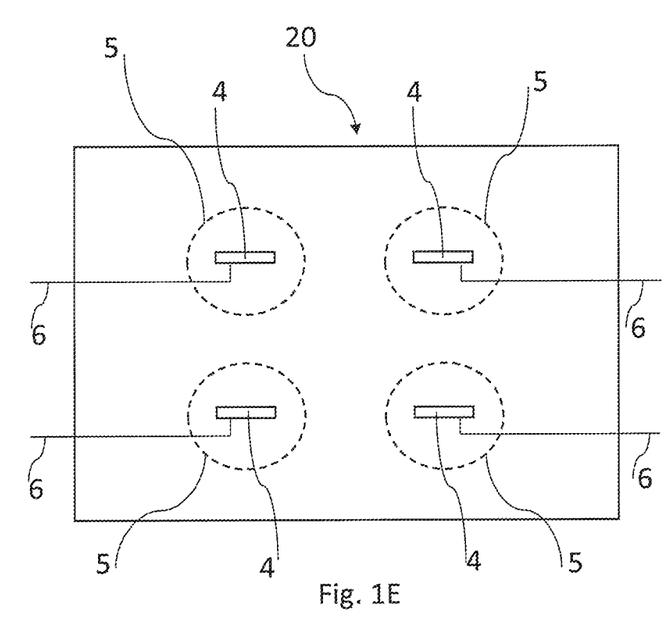
FIG. 1E shows a top view of another embodiment of the present decorative panel.

According to FIG. 1E decorative panel 20 is provided with four induction coils 4 surrounded by shielding layers 5. The size of shielding layer 5 stretches a minimum value of 20 cm around induction coil 4. The number of inductions coils is not limited. The size or shape of the induction coil 4 shown in FIGS. 1A-1E is not limited to the size and shape shown here.

Further advantages of the invention will become apparent by reference to the detailed description of preferred embodiments.

Example 1: Manufacturing of an Induction Charger Panel

According to this example a commercial induction charger of the type ZENS Single Wireless Charger (#ZESC05B/00) was thermo pressed into a decorative panel. The induction charger was placed in a recess made in a prepreg, and the recess with the induction charger was completely covered by a layer of one resin impregnated paper. On top of that resin impregnated layer a décor layer was applied as the outer most surface layer. The composite thus obtained was pressed at 160° C. and 20 bar until curing of the thermoset resin was achieved. The induction charger present in the final panel receives its electricity via a cable that connects the induction charger with a standard domestic power outlet. A cell phone was placed on the outermost surface of the panel, the induction charger of the panel was actuated by the external power source and the cell phone was wirelessly charged.

Example 2: Manufacturing of an Induction Charger Panel

A single wired induction coil of similar type as can be found in ZENS 20 Single Wireless Charger was placed in a recess made in a prepreg, with five resin impregnated papers placed on top of the coil, thereby obtaining a composite comprising a prepreg and an induction coil completely covered by resin impregnated papers. The induction coil is thus seamless integrated into the composite. On top of the resin impregnated papers thus positioned a décor layer was placed and this assembly was pressed at 160° C. and 70 bar until curing of the thermoset resin was achieved. The cables from the integrated coil from the panel thus obtained were connected to an external power source. A cell phone was placed on the outermost surface of the panel, the induction charger of the panel was actuated and the cell phone was wirelessly charged.

Example 3: Manufacturing of an Induction Charger Panel

A single wired induction coil of similar type as can be found in ZENS 20 Single Wireless Charger was placed in recesses created in a stack of resin impregnated papers, followed by adding five resin impregnated papers without recesses on top of the coil thus positioned, thereby obtaining a composite comprising resin impregnated papers and a completely integrated induction coil. On top of the resin impregnated papers thus positioned a décor layer was placed. The assembly thus obtained was pressed at 160° C. and 70 bar until curing of the thermoset resin was achieved. The cables from the integrated coil from the panel thus obtained were connected to an external power source. A cell phone was placed on the outermost surface of the panel, the induction charger of the panel was actuated and the cell phone was wirelessly charged.

Example 4: Manufacturing of an Induction Charger Panel

Figure 2:
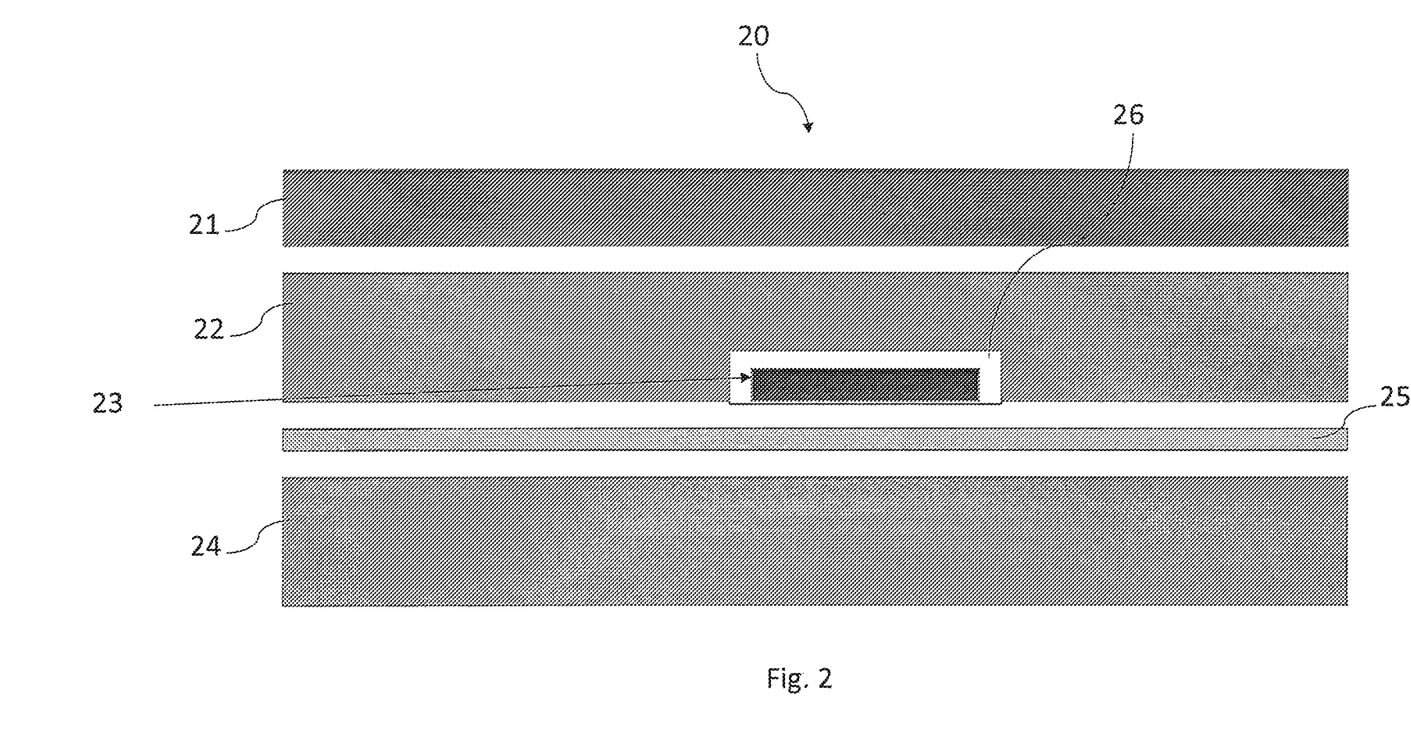
FIG. 2 shows an embodiment of the present decorative panel.

According to this example 4 a commercial induction charger of the type ZENS Single Wireless Charger (#ZESC05B/00) was thermo pressed into a decorative panel 20. The induction charger 23 was placed in a recess 26 made in a prepreg 22 following FIG. 2. On a prepreg 24 a shielding layer 25 (FINEMET® Ultra-Light Weight, Flexible Magnetic Shielding in PET thermoplastic carrier) was placed. On top of shielding layer 25 an induction charger 23 was placed. A prepreg 22 provided with a recess 26 centered over the induction charger 23 was used. On top of the prepreg 22 provided with recess 26 a décor layer 21 was applied as the outer most surface layer. The composite 20 (see FIG. 2) thus obtained was pressed at 160° C. and 20 bar until curing of the thermoset resin was achieved. The induction charger present in the final panel receives its electricity via a cable (not shown here) that connects the induction charger with a standard domestic power outlet. A cell phone was placed on the outermost surface of the panel, the induction charger of the panel was actuated by the external power source and the cell phone was wirelessly charged.

Example 5: Manufacturing of an Induction Charger Panel

Figure 3:
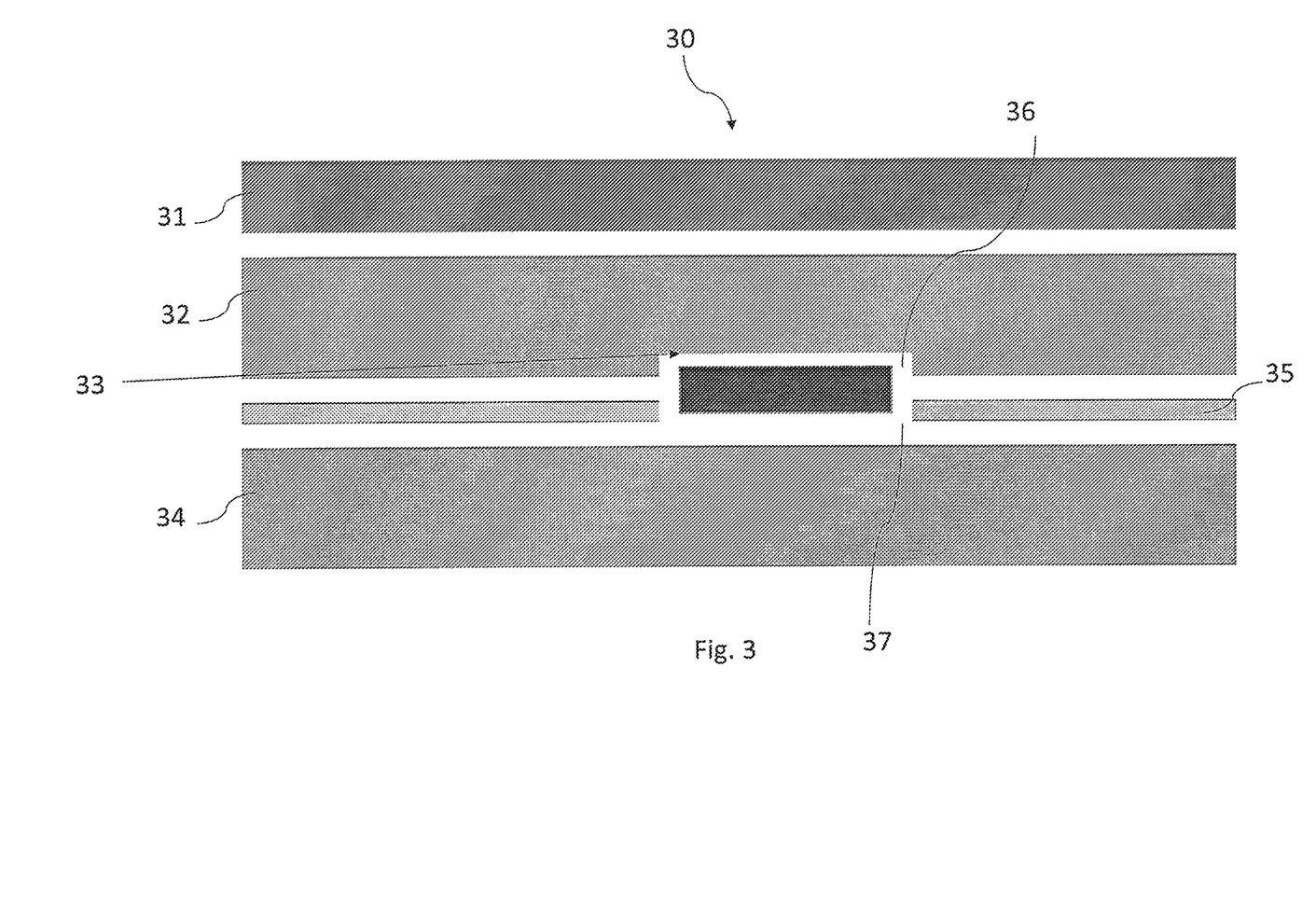
FIG. 3 shows another embodiment of the present decorative panel.

The same steps as in Example 4 were carried out, except for the construction of both prepreg 32 and shielding layer 35. In this Example 4 shielding layer 35 is provided with a hole 37 in which induction charger 33 is positioned. Prepreg 32 is provided with a recess 36. Recess 36 and hole 37 are in alignment and induction charger 33 is embedded in both prepreg 32 and shielding layer 35. Shielding layer 35 is positioned on top of prepreg 34. On top of the prepreg 32 provided with recess 36 a décor layer 31 was applied as the outer most surface layer. The composite 30 (see FIG. 3) thus obtained was pressed at 160° C. and 20 bar until curing of the thermoset resin was achieved. The induction charger present in the final panel receives its electricity via a cable (not shown here) that connects the induction charger with a standard domestic power outlet. A cell phone was placed on the outermost surface of the panel, the induction charger of the panel was actuated by the external power source and the cell phone was wirelessly charged.

Example 6: Manufacturing of an Induction Charger Panel

Figure 4:
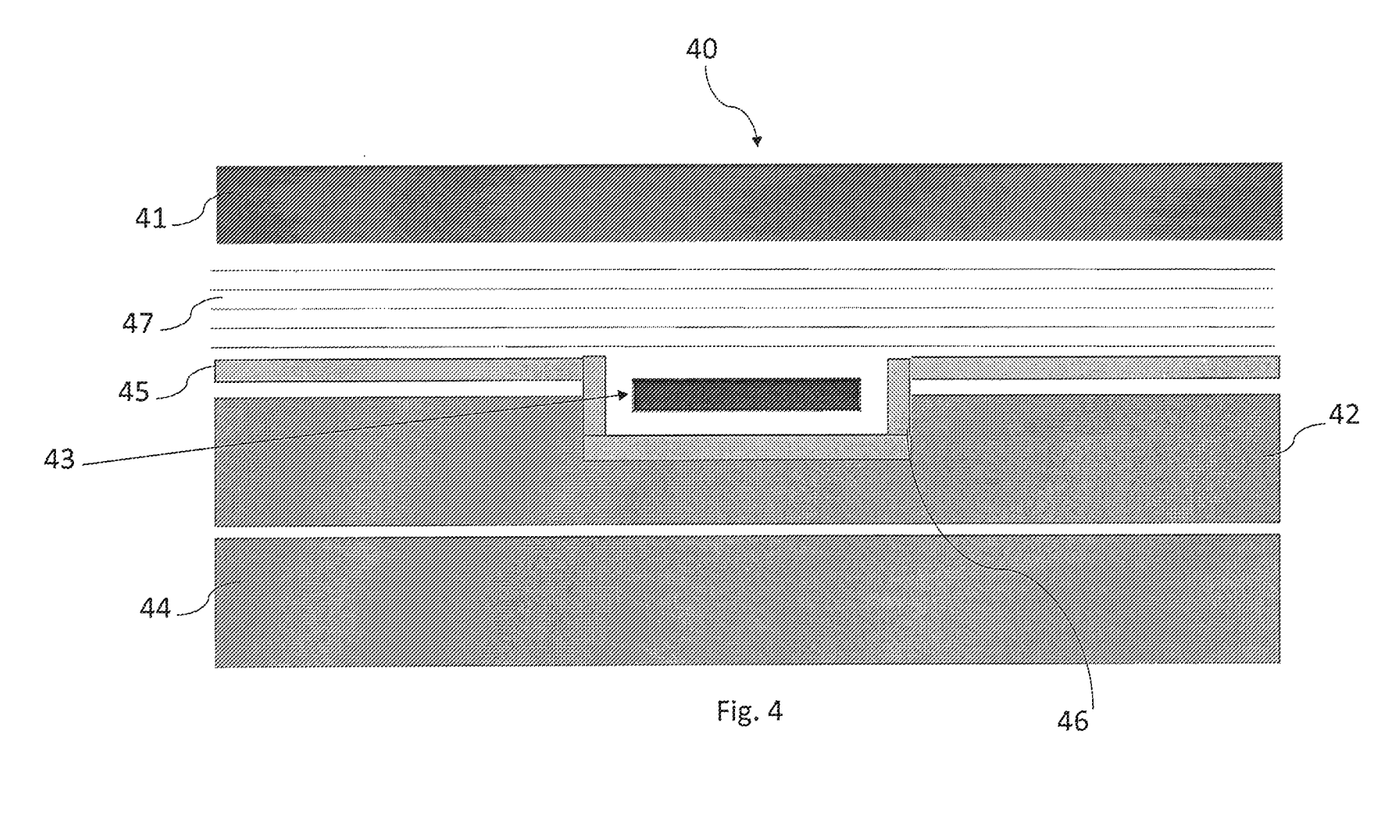
FIG. 4 shows another embodiment of the present decorative panel.

A single wired induction coil of similar type as can be found in ZENS Single Wireless Charger was used in this example 6. A recess 46 in prepreg 42 was made, a shielding layer 45 (FINEMET® Ultra-Light Weight, Flexible Magnetic Shielding in PET thermoplastic carrier) was placed on top of prepreg 42, 44, and following recess 46. The induction charger 43 was placed in recess 46, so that induction charger 43 is shielded. Induction charger 43 has contacts to the shielding layer 46 at all sides including bottom (See FIG. 4). Five resin impregnated papers 47 were placed on top of coil 43, and a décor layer 41 was applied as the outer most surface layer thereby obtaining composite 40 comprising prepreg 42, 44 and induction coil 43 completely covered by resin impregnated papers 47 and shielding layer 45 at sides and bottom of coil 43. The induction coil 43 is thus seamless integrated into the composite. On top of resin impregnated papers 47 thus positioned a décor layer 41 was placed and this assembly 40 (see FIG. 4) was pressed at 160° C. and 70 bar until curing of the thermoset resin was achieved. The cables (not shown here) from the integrated coil of the panel thus obtained were connected to an external power source (not shown here). A cell phone was placed on the outermost surface of the panel, the induction charger of the panel was actuated and the cell phone was wirelessly charged.

Example 7: Manufacturing of an Induction Charger Panel

Figure 5:
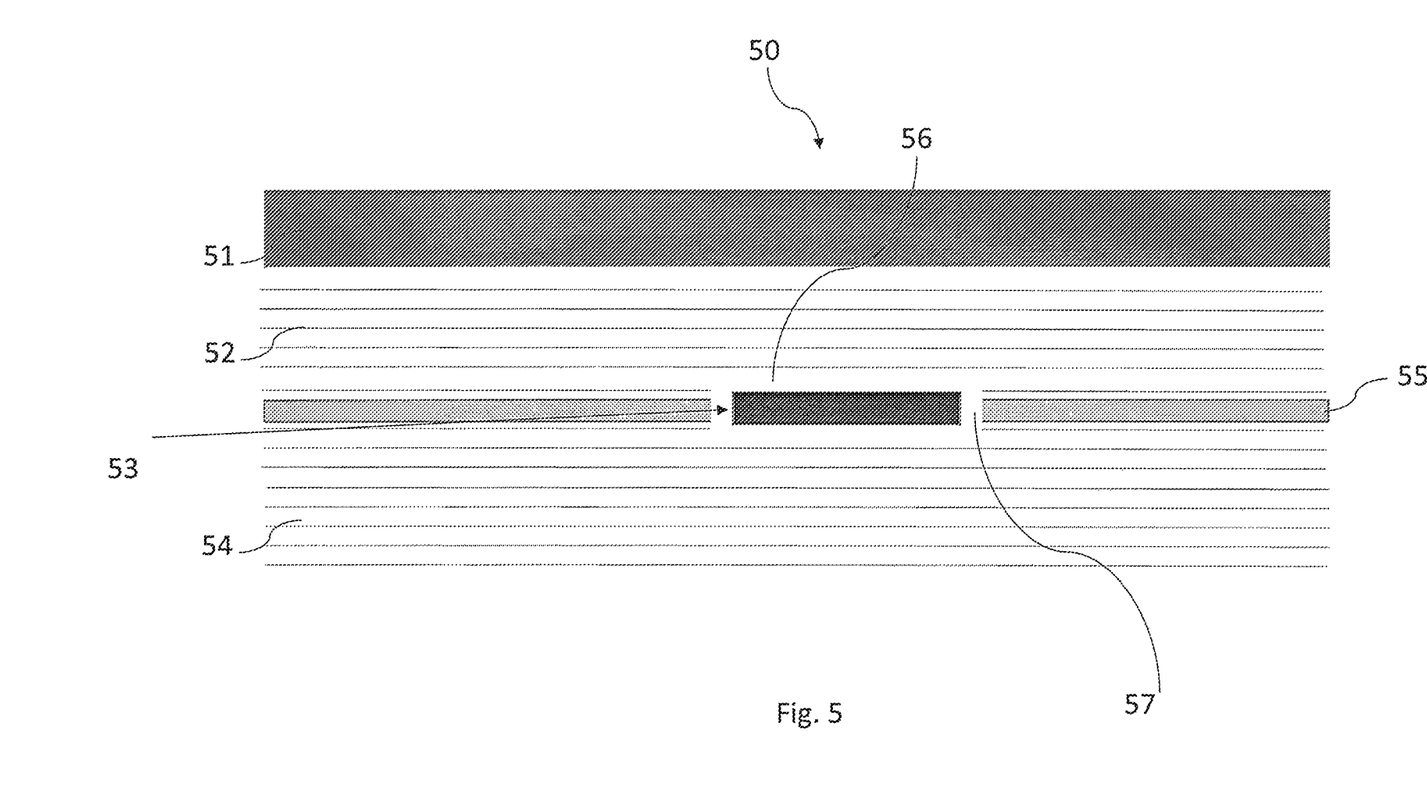
FIG. 5 shows another embodiment of the present decorative panel.

A single wired induction coil 53 of similar type as can be found in ZENS Single Wireless Charger was placed in a recess 56 created in a stack of resin impregnated papers 54 and a recess 57 created in a shielding layer 55 (FINEMET® Ultra-Light Weight, Flexible Magnetic Shielding in PET thermoplastic carrier). Recess 56 and recess 57 are in alignment. Next five resin impregnated papers 52 without recesses were added on top of the coil 53 thus positioned, thereby obtaining a composite 50 comprising resin impregnated papers and a completely integrated induction coil. On top of the resin impregnated papers thus positioned a décor layer 51 was placed. The assembly thus obtained was pressed at 160° C. and 70 bar until curing of the thermoset resin was achieved. The cables (not shown here) from the integrated coil from the panel thus obtained were connected to an external power source. A cell phone was placed on the outermost surface of the panel, the induction charger of the panel was actuated and the cell phone was wirelessly charged. The efficiency of charging of the phone was comparable to that in example 3.

Although in FIGS. 2-5 the shielding layer 23, 33, 43 and 53 is shown over the whole width of the panel, the size of shielding layer 5 can be such that it stretches a minimum value of 20 cm around the relevant induction coil.

Example 8: Comparison of Heat Absorption for Induction Panel with and without Shielding Layer Two different panel types were used, namely a panel as described in Example 1 (no shielding layer) and a panel as described in Example 4 (with shielding layer made of FINEMET® Ultra-Light Weight, Flexible Magnetic Shielding in PET thermoplastic carrier). A ferromagnetic metal (iron) was placed below each panel, underneath the shielding layer, and the temperature of the metal was measured. The temperature of the iron below the panel with the shielding layer was lower than the temperature of the iron below the panel without shielding layer.

The invention claimed is:

1. A decorative panel, comprising a core layer provided with a decor layer, said décor layer comprising a substrate layer provided with at least one coating, and at least one induction coil located within the decorative panel;
    wherein said décor layer comprises a thermo pressed stack of resin impregnated papers and said at least one induction coil is located in said thermo pressed stack of resin impregnated papers;
    wherein said decorative panel further comprises at least one shielding layer for an electromagnetic field generated by said at least one induction coil, said at least one shielding layer is located within said decorative panel; and
    wherein said at least one induction coil is surrounded by said at least one shielding layer.

2. The decorative panel according to claim 1, wherein within said décor layer said at least one induction coil is located between said substrate layer and said at least one coating.

3. The decorative panel according to claim 1, wherein within said décor layer said at least one induction coil is located within said at least one coating.

4. The decorative panel according to claim 1, wherein said at least one induction coil is positioned between said décor layer and said at least one shielding layer.

5. The decorative panel according to claim 1, wherein said at least one shielding layer is provided with at least one recess, in which said at least one recess said at least one induction coil is positioned.

6. The decorative panel according to claim 1, wherein said at least one shielding layer comprises at least one of magnetic and ferro-magnetic materials.

7. The decorative panel according to claim 6, wherein said magnetic and ferro-magnetic materials are chosen from the group of ferrite, nickel and cobalt, or combinations thereof, wherein said magnetic and ferro-magnetic materials are used as pure metals or as composites.

8. The decorative panel according to claim 1, wherein said at least one shielding layer comprises a matrix material provided with a dispersion of at least one of magnetic and ferro-magnetic materials.

9. The decorative panel according to claim 1, wherein said decorative panel further comprises at least one power source, said at least one power source being connected to said at least one induction coil.

10. The decorative panel according to claim 1, wherein said at least one induction coil is connected to at least one electric wire, said at least one wire being connectable to at least one power source not incorporated in said decorative panel.

11. The decorative panel according to claim 1, wherein said thermo pressed stack of resin impregnated papers is provided with one or more recesses in which one or more recesses said at least one induction coil is placed.

12. The decorative panel according to claim 11, wherein said one or more recesses is provided with one or more shielding layers, in which one or more recesses said at least one induction coil is placed.

13. The decorative panel according to claim 11, wherein said one or more recesses provided with said at least one induction coil are covered with at least one thermo pressed resin impregnated paper.

14. The decorative panel according to claim 1, wherein between said core layer and said décor layer one or more sub layers are present, said sub layers are chosen from the group of thermo pressed resin impregnated paper, thermo formable sheet and prepregs, or a combination thereof.

15. The decorative panel according to claim 1, wherein said substrate layer of said décor layer is chosen from the group of resin impregnated papers, non-wovens and wovens of any one or more of wood fibres, glass fibres, textile fibres, synthetic fibres, metallic fibres, ceramic fibres and carbon fibres, foils of any one or more of polymers, metals and ceramics, or a combination thereof.

16. The decorative panel according to claim 1, wherein said at least one induction coil is provided as one or more of the group consisting of an induction coil printed on a flexible carrier, wherein the flexible carrier is chosen from the group of paper, plastic foil or textile, a rigid induction coil and flexible coil, or a combination thereof.

17. The decorative panel according to claim 1, wherein said at least one induction coil cannot be removed without destructing said panel.

18. The decorative panel according to claim 1, wherein the decorative panel is a component of at least one of furniture, a tabletop, a laboratory table, a countertop, a nightstand, a picnic table, a hot plate, an interior wall, an exterior wall, a ceiling, and a façade.

19. A decorative panel, comprising a core layer provided with a decor layer, said décor layer comprising a substrate layer provided with at least one coating, and at least one induction coil located within the decorative panel;
- wherein said décor layer comprises a thermo pressed stack of resin impregnated papers and said at least one induction coil is located in said thermo pressed stack of resin impregnated papers;
- wherein said decorative panel further comprises at least one shielding layer for an electromagnetic field generated by said at least one induction coil, said at least one shielding layer is located within said decorative panel; and
- wherein said at least one shielding layer includes a recess in which said at least one induction coil is positioned.

\* \* \* \* \*